US006961487B2

(12) United States Patent
Wong

(10) Patent No.: US 6,961,487 B2
(45) Date of Patent: Nov. 1, 2005

(54) METHOD AND STRUCTURE FOR A PUSHER-MODE PIEZOELECTRICALLY ACTUATED LIQUID METAL OPTICAL SWITCH

(75) Inventor: Marvin Glenn Wong, Woodland Park, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 268 days.

(21) Appl. No.: 10/412,895

(22) Filed: Apr. 14, 2003

(65) Prior Publication Data

US 2004/0202411 A1    Oct. 14, 2004

(51) Int. Cl.[7] ............................. G02B 6/26; G02B 6/42
(52) U.S. Cl. ............................. 385/19; 385/16; 385/18
(58) Field of Search .................................. 385/14–24

(56) References Cited

U.S. PATENT DOCUMENTS

| | | |
|---|---|---|
| 2,312,672 A | 3/1943 | Pollard, Jr. |
| 2,564,081 A | 8/1951 | Schilling |
| 3,430,020 A | 2/1969 | Von Tomkewitsch et al. |
| 3,529,268 A | 9/1970 | Rauterberg |
| 3,600,537 A | 8/1971 | Twyford |
| 3,639,165 A | 2/1972 | Rairden, III |
| 3,657,647 A | 4/1972 | Beusman et al. |
| 4,103,135 A | 7/1978 | Gomez et al. |
| 4,200,779 A | 4/1980 | Zakurdaev et al. |
| 4,238,748 A | 12/1980 | Goullin et al. |
| 4,245,886 A | 1/1981 | Kolodzey et al. |
| 4,336,570 A | 6/1982 | Brower |
| 4,419,650 A | 12/1983 | John |
| 4,434,337 A | 2/1984 | Becker |
| 4,475,033 A | 10/1984 | Willemsen et al. |
| 4,505,539 A | 3/1985 | Auracher et al. |
| 4,582,391 A | 4/1986 | Legrand |
| 4,628,161 A | 12/1986 | Thackrey |
| 4,652,710 A | 3/1987 | Karnowsky et al. |
| 4,657,339 A | 4/1987 | Fick |
| 4,742,263 A | 5/1988 | Harnden, Jr. et al. |

(Continued)

FOREIGN PATENT DOCUMENTS

EP        0593836 A1     10/1992

(Continued)

OTHER PUBLICATIONS

Bhedwar, Homi C. et al. "Ceramic Multilayer Package Fabrication." Electronic Materials Handbook, Nov. 1989, pp. 460–469, vol. 1 Packaging, Section 4: Packages.

(Continued)

*Primary Examiner*—Akm Enayet Ullah
*Assistant Examiner*—Kevin S. Wood

(57) ABSTRACT

A method and structure for an optical switch. According to the structure of the present invention, a liquid-filled chamber is housed within a solid material. A plurality of seal belts within the liquid-filled chamber are coupled to the solid material, while a plurality of piezoelectric elements are coupled to a plurality of membranes. The plurality of membranes are coupled to the liquid-filled chamber, and a plurality of optical waveguides are coupled to the liquid-filled chamber. The plurality of seal belts are coupled to a plurality of liquid metal globules. According to the method, one or more piezoelectric elements are actuated, causing one or more corresponding membrane elements to be deflected. The deflection of the membrane element changes a pressure of actuator liquid and the change in pressure of the actuator liquid breaks a liquid metal connection between a first contact and a second contact of the electrical switch. The breaking of the liquid metal connection is operable to block or unblock one or more of the plurality of optical waveguides.

32 Claims, 10 Drawing Sheets

U.S. PATENT DOCUMENTS

| | | | |
|---|---|---|---|
| 4,786,130 A | 11/1988 | Georgiou et al. |
| 4,797,519 A | 1/1989 | Elenbaas |
| 4,804,932 A | 2/1989 | Akanuma et al. |
| 4,988,157 A | 1/1991 | Jackel et al. |
| 5,278,012 A | 1/1994 | Yamanaka et al. |
| 5,415,026 A | 5/1995 | Ford |
| 5,502,781 A | 3/1996 | Li et al. |
| 5,644,676 A | 7/1997 | Blomberg et al. |
| 5,675,310 A | 10/1997 | Wojnarowski et al. |
| 5,677,823 A | 10/1997 | Smith |
| 5,751,074 A | 5/1998 | Prior et al. |
| 5,751,552 A | 5/1998 | Scanlan et al. |
| 5,828,799 A | 10/1998 | Donald |
| 5,841,686 A | 11/1998 | Chu et al. |
| 5,849,623 A | 12/1998 | Wojnarowski et al. |
| 5,874,770 A | 2/1999 | Saia et al. |
| 5,875,531 A | 3/1999 | Nellissen et al. |
| 5,886,407 A | 3/1999 | Polese et al. |
| 5,889,325 A | 3/1999 | Uchida et al. |
| 5,912,606 A | 6/1999 | Nathanson et al. |
| 5,915,050 A | 6/1999 | Russell et al. |
| 5,972,737 A | 10/1999 | Polese et al. |
| 5,994,750 A | 11/1999 | Yagi |
| 6,021,048 A | 2/2000 | Smith |
| 6,180,873 B1 | 1/2001 | Bitko |
| 6,201,682 B1 | 3/2001 | Mooij et al. |
| 6,207,234 B1 | 3/2001 | Jiang |
| 6,212,308 B1 | 4/2001 | Donald |
| 6,225,133 B1 | 5/2001 | Yamamichi et al. |
| 6,278,541 B1 | 8/2001 | Baker |
| 6,304,450 B1 | 10/2001 | Dibene, II et al. |
| 6,320,994 B1 | 11/2001 | Donald et al. |
| 6,323,447 B1 | 11/2001 | Kondoh |
| 6,351,579 B1 | 2/2002 | Early et al. |
| 6,356,679 B1 | 3/2002 | Kapany |
| 6,373,356 B1 | 4/2002 | Gutierrez |
| 6,396,012 B1 | 5/2002 | Bloomfield |
| 6,396,371 B2 | 5/2002 | Streeter et al. |
| 6,408,112 B1 | 6/2002 | Bartels |
| 6,446,317 B1 | 9/2002 | Figueroa et al. |
| 6,453,086 B1 | 9/2002 | Tarazona |
| 6,470,106 B2 | 10/2002 | McClelland et al. |
| 6,487,333 B2 | 11/2002 | Fouquet |
| 6,501,354 B1 | 12/2002 | Gutierrez et al. |
| 6,512,322 B1 | 1/2003 | Wong et al. |
| 6,515,404 B1 | 2/2003 | Wong |
| 6,516,504 B2 | 2/2003 | Schaper |
| 6,559,420 B1 | 5/2003 | Zarev |
| 6,633,213 B1 | 10/2003 | Dove |
| 6,818,844 B2 * | 11/2004 | Wong et al. ................ 200/182 |
| 2002/0037128 A1 | 3/2002 | Burger et al. |
| 2002/0146197 A1 | 10/2002 | Yong |
| 2002/0150323 A1 | 10/2002 | Nishida et al. |
| 2002/0168133 A1 | 11/2002 | Saito |
| 2003/0035611 A1 | 2/2003 | Shi |

FOREIGN PATENT DOCUMENTS

| | | |
|---|---|---|
| FR | 2418539 A | 9/1979 |
| FR | 2458138 A1 | 10/1980 |
| FR | 2667396 | 9/1990 |
| JP | 36-18575 | 10/1961 |
| JP | 47-21645 | 10/1972 |
| JP | 63-276838 | 5/1987 |
| JP | 01-294317 | 5/1988 |
| JP | 08-125487 A | 5/1996 |
| JP | 9161640 A | 6/1997 |
| WO | WO 99/46624 A1 | 9/1999 |

OTHER PUBLICATIONS

"Integral Power Resistors for Aluminum Substrate." IBM Technical Disclosure Bulletin, Jun. 1984, US, Jun. 1, 1984, p. 827, vol. 27, No. 1B, TDB-ACC-NO: NB8406827, Cross Reference: 0018-8689-27-1B-827.

Kim, Joonwon et al. "A Micromechanical Switch with Electrostatically Driven Liquid-Metal Droplet." Sensors and Actuators, A: Physical. v 9798, Apr. 1, 2002, 4 pages.

* cited by examiner

METHOD AND STRUCTURE FOR A PUSHER-MODE PIEZOELECTRICALLY ACTUATED LIQUID METAL OPTICAL SWITCH

CROSS REFERENCE TO RELATED APPLICATIONS

This application is related to the following co-pending U.S. Patent Applications, being identified by the below enumerated identifiers and arranged in alphanumerical order, which have the same ownership as the present application and to that extent are related to the present application and which are hereby incorporated by reference:

Application 10010448-1, titled "Piezoelectrically Actuated Liquid Metal Switch", filed May 2, 2002 and identified by Ser. No. 10/137,691;

Application 10010529-1, "Bending Mode Latching Relay", and having the same filing date as the present application;

Application 10010531-1, "High Frequency Bending Mode Latching Relay", and having the same filing date as the present application;

Application 10010570-1, titled "Piezoelectrically Actuated Liquid Metal Switch", filed May 2, 2002 and identified by Ser. No. 10/142,076;

Application 10010571-1, "High-frequency, Liquid Metal, Latching Relay with Face Contact", and having the same filing date as the present application;

Application 10010572-1, "Liquid Metal, Latching Relay with Face Contact", and having the same filing date as the present application;

Application 10010573-1, "Insertion Type Liquid Metal Latching Relay", and having the same filing date as the present application;

Application 10010617-1, "High-frequency, Liquid Metal, Latching Relay Array", and having the same filing date as the present application;

Application 10010618-1, "Insertion Type Liquid Metal Latching Relay Array", and having the same filing date as the present application;

Application 10010634-1, "Liquid Metal Optical Relay", and having the same filing date as the present application;

Application 10010640-1, titled "A Longitudinal Piezoelectric Optical Latching Relay", filed Oct. 31, 2001 and identified by Ser. No. 09/999,590;

Application 10010643-1, "Shear Mode Liquid Metal Switch", and having the same filing date as the present application;

Application 10010644-1, "Bending Mode Liquid Metal Switch", and having the same filing date as the present application;

Application 10010656-1, titled "A Longitudinal Mode Optical Latching Relay", and having the same filing date as the present application;

Application 10010663-1, "Method and Structure for a Pusher-Mode Piezoelectrically Actuated Liquid Metal Switch", and having the same filing date as the present application;

Application 10010790-1, titled "Switch and Production Thereof", filed Dec. 12, 2002 and identified by Ser. No. 10/317,597;

Application 10011055-1, "High Frequency Latching Relay with Bending Switch Bar", and having the same filing date as the present application;

Application 10011056-1, "Latching Relay with Switch Bar", and having the same filing date as the present application;

Application 10011064-1, "High Frequency Push-mode Latching Relay", and having the same filing date as the present application;

Application 10011065-1, "Push-mode Latching Relay", and having the same filing date as the present application;

Application 10011121-1, "Closed Loop Piezoelectric Pump", and having the same filing date as the present application;

Application 10011329-1, titled "Solid Slug Longitudinal Piezoelectric Latching Relay", filed May 2, 2002 and identified by Ser. No. 10/137,692;

Application 10011344-1, "Method and Structure for a Slug Pusher-Mode Piezoelectrically Actuated Liquid Metal Switch", and having the same filing date as the present application;

Application 10011345-1, "Method and Structure for a Slug Assisted Longitudinal Piezoelectrically Actuated Liquid Metal Optical Switch", and having the same filing date as the present application;

Application 10011397-1, "Method and Structure for a Slug Assisted Pusher-Mode Piezoelectrically Actuated Liquid Metal Optical Switch", and having the same filing date as the present application;

Application 10011398-1, "Polymeric Liquid Metal Switch", and having the same filing date as the present application;

Application 10011410-1, "Polymeric Liquid Metal Optical Switch", and having the same filing date as the present application;

Application 10011436-1, "Longitudinal Electromagnetic Latching Optical Relay", and having the same filing date as the present application;

Application 10011437-1, "Longitudinal Electromagnetic Latching Relay", and having the same filing date as the present application;

Application 10011458-1, "Damped Longitudinal Mode Optical Latching Relay", and having the same filing date as the present application;

Application 10011459-1, "Damped Longitudinal Mode Latching Relay", and having the same filing date as the present application;

Application 10020013-1, titled "Switch and Method for Producing the Same", filed Dec. 12, 2002 and identified by Ser. No. 10/317,963;

Application 10020027-1, titled "Piezoelectric Optical Relay", filed Mar. 28, 2002 and identified by Ser. No. 10/109,309;

Application 10020071-1, titled "Electrically Isolated Liquid Metal Micro-Switches for Integrally Shielded Microcircuits", filed Oct. 8, 2002 and identified by Ser. No. 10/266,872;

Application 10020073-1, titled "Piezoelectric Optical Demultiplexing Switch", filed Apr. 10, 2002 and identified by Ser. No. 10/119,503;

Application 10020162-1, titled "Volume Adjustment Apparatus and Method for Use", filed Dec. 12, 2002 and identified by Ser. No. 10/317,293;

Application 10020241-1, "Method and Apparatus for Maintaining a Liquid Metal Switch in a Ready-to-Switch Condition", and having the same filing date as the present application;

Application 10020242-1, titled "A Longitudinal Mode Solid Slug Optical Latching Relay", and having the same filing date as the present application;

Application 10020473-1, titled "Reflecting Wedge Optical Wavelength Multiplexer/Demultiplexer", and having the same filing date as the present application;

Application 10020540-1, "Method and Structure for a Solid Slug Caterpillar Piezoelectric Relay", and having the same filing date as the present application;

Application 10020541-1, titled "Method and Structure for a Solid Slug Caterpillar Piezoelectric Optical Relay", and having the same filing date as the present application;

Application 10030438-1, "Inserting-finger Liquid Metal Relay", and having the same filing date as the present application;

Application 10030440-1, "Wetting Finger Liquid Metal Latching Relay", and having the same filing date as the present application;

Application 10030521-1, "Pressure Actuated Optical Latching Relay", and having the same filing date as the present application;

Application 10030522-1, "Pressure Actuated Solid Slug Optical Latching Relay", and having the same filing date as the present application; and Application 10030546-1, "Method and Structure for a Slug Caterpillar Piezoelectric Reflective Optical Relay", and having the same filing date as the present application.

TECHNICAL FIELD

This invention relates generally to the field of electronic devices and systems, and more specifically to optical switching technology.

BACKGROUND

A relay or switch may be used to change an optical signal from a first state to a second state. In general there may be more than two states. In applications that require a small switch geometry or a large number of switches within a small region, semiconductor fabrication techniques may be used to create switches with a small footprint. A semiconductor switch may be used in a variety of applications, such as industrial equipment, telecommunications equipment and control of electromechanical devices such as ink jet printers.

In switching applications, the use of piezoelectric technology may be used to actuate a switch. Piezoelectric materials have several unique characteristics. A piezoelectric material can be made to expand or contract in response to an applied voltage. This is known as the indirect piezoelectric effect. The amount of expansion or contraction, the force generated by the expansion or contraction, and the amount of time between successive contractions are important material properties that influence the application of a piezoelectric material in a particular application. Piezoelectric material also exhibits a direct piezoelectric effect, in which an electric field is generated in response to an applied force. This electric field may be converted to a voltage if contacts are properly coupled to the piezoelectric material. The indirect piezoelectric effect is useful in making or breaking a contact within a switching element, while the direct piezoelectric effect is useful in generating a switching signal in response to an applied force.

SUMMARY

A method and structure for an optical switch is disclosed. According to the structure of the present invention, a liquid-filled chamber coupled to a plurality of optical waveguides is housed within a solid material. Seal belts within the liquid-filled chamber are coupled to the solid material, while piezoelectric elements are coupled to a plurality of membranes. The plurality of membranes are coupled to the liquid-filled chamber. The plurality of seal belts are coupled to a plurality of liquid metal globules. According to the method of the present invention, piezoelectric elements are actuated, causing membrane elements to be deflected. The deflection of the membrane elements changes a pressure of actuator liquid and the change in pressure of the actuator liquid breaks a liquid metal connection between a first contact and a second contact of the electrical switch, thereby blocking or unblocking one or more optical waveguides.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION

Figure 1:
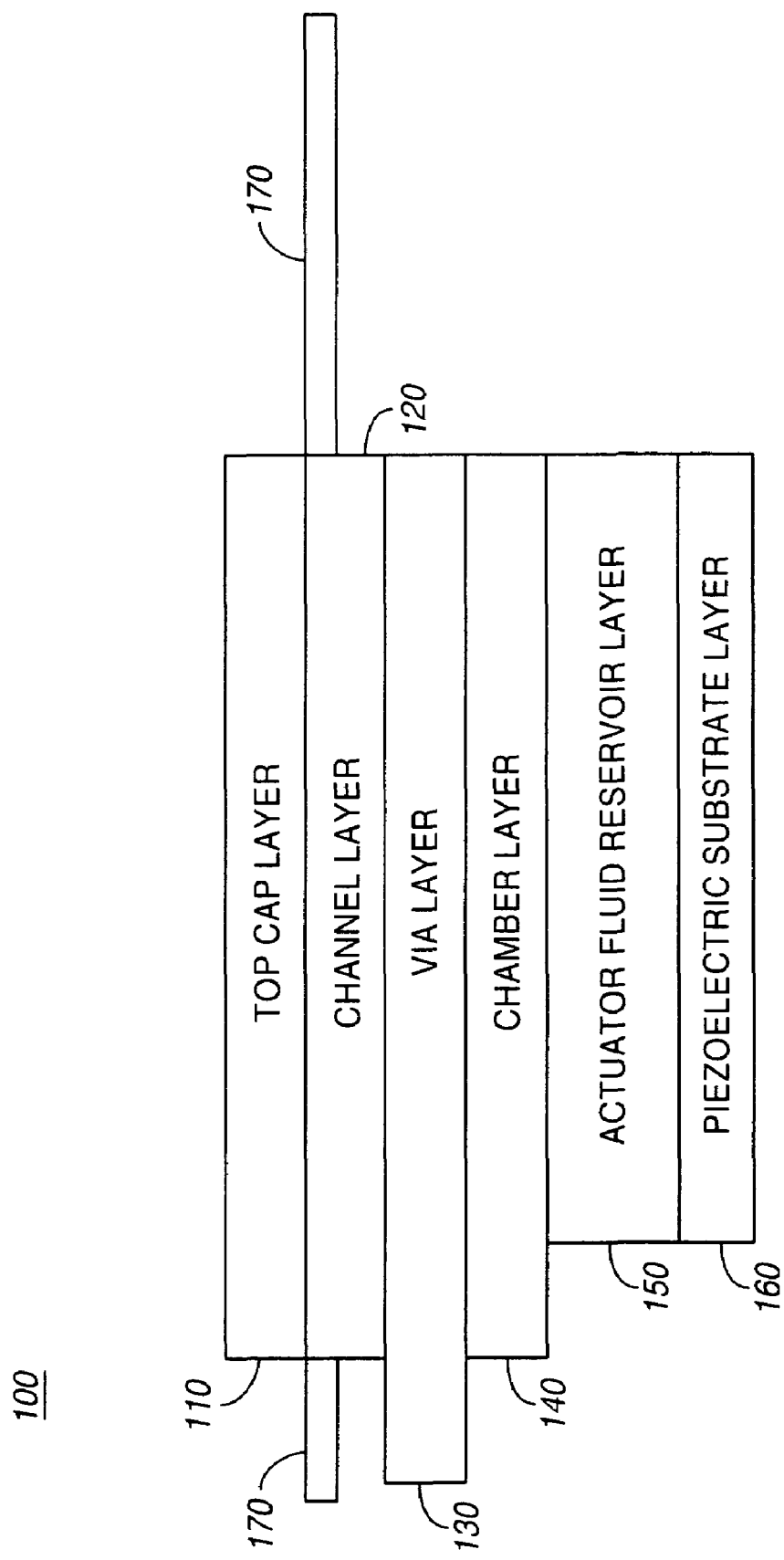
FIG. 1 is a side view of a pusher mode liquid metal optical switch, according to certain embodiments of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

A liquid metal switch may be represented using a plurality of layers, wherein the plurality of layers represent layers created during a fabrication of the liquid metal switch.

Referring now to FIG. 1, a side view 100 of a pusher mode liquid metal optical switch 105 is shown, according to certain embodiments of the present invention. Pusher mode liquid metal optical switch 105 comprises a top cap layer 110, channel layer 120, via layer 130, chamber layer 140, actuator fluid reservoir layer 150, piezoelectric substrate layer 160, and optical waveguide 170. In certain embodiments of the present invention, cap layer 110 is coupled to channel layer 120, channel layer 120 is coupled to via layer 130, via layer 130 is coupled to chamber layer 140, chamber layer 140 is coupled to actuator fluid reservoir layer 150, actuator fluid reservoir layer 150 is coupled to piezoelectric substrate layer 160, and optical waveguide 170 is coupled to one or more of cap layer 110 and channel layer 120. It is noted that piezoelectric substrate layer 160 may further comprise a plurality of circuit traces, wherein the plurality of circuit traces are not shown in FIG. 1. It is noted that one or more of the layers shown in FIG. 1 may be combined without departing from the spirit and scope of the present invention. In certain embodiments of the present invention, the cap layer 110, channel layer 120, via layer 130, chamber layer 140, and actuator fluid reservoir layer 150 may be composed of one or more of glass, ceramic, composite material and ceramic-coated material.

Figure 2:
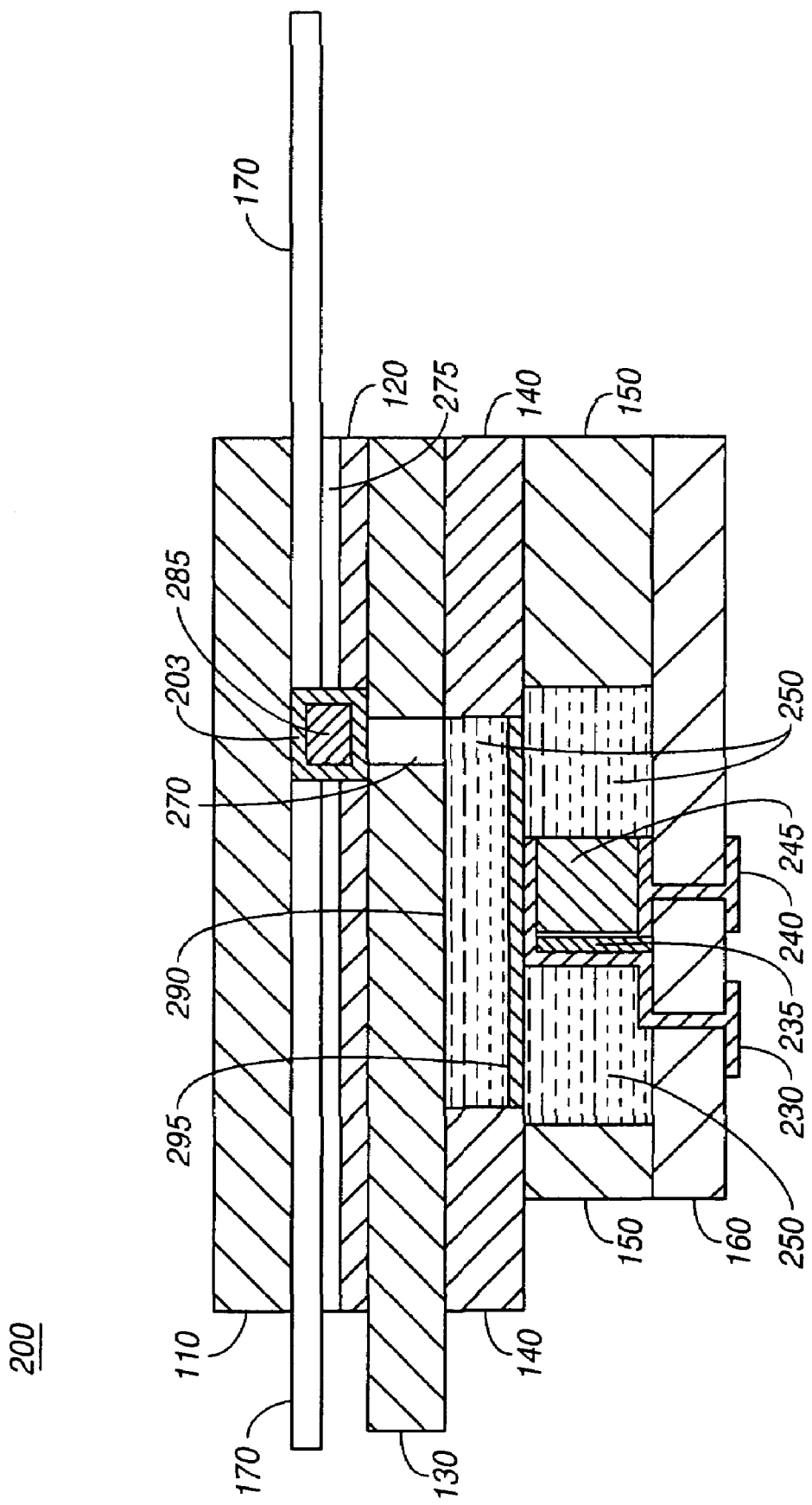
FIG. 2 is a cross sectional drawing of a pusher mode liquid metal optical switch, according to certain embodiments of the present invention.

Referring now to FIG. 2, a cross-sectional drawing 200 of pusher mode liquid metal optical switch 105 is shown, according to certain embodiments of the present invention. Cross-sectional drawing 200 illustrates how plurality of optical waveguides 170 are coupled to channel 285 and a plurality of seal belts 203. Plurality of seal belts 203 are further coupled to encapsulant 275 and channel layer 120. In certain embodiments of the present invention, encapsulant 275 is composed of an inert, mechanically stable, quick-setting adhesive such as a UV curable epoxy or acrylic. In certain embodiments of the present invention, plurality of seal belts 203 are operable to be coupled to a liquid metal contained in channel 285 thereby blocking one or more of the plurality of optical waveguides 170. Channel 285 is further coupled to plurality of vias 270. Plurality of vias 270 are within via layer 130 and are operable to provide a path for actuator fluid 250 to enter channel 285, wherein actuator fluid 250 is located in one or more reservoirs of actuator fluid reservoir layer 150 and in chamber 290 of chamber layer 140.

Chamber 290 is further coupled to plurality of membranes 295. In certain embodiments of the present invention, plurality of membranes 295 are located in the chamber layer 140. Plurality of membranes 295 are further coupled to the plurality of reservoirs of actuator fluid reservoir layer 150 and further coupled to a plurality of first contacts 230. Plurality of first contacts 230 and plurality of second contacts 240 are operable to actuate a corresponding plurality of piezoelectric elements 245. In certain embodiments of the present invention, plurality of first contacts 230 and plurality of second contacts 240 are isolated by a plurality of dielectric elements 235. Plurality of first contacts 230 and plurality of second contacts 240 are further externally accessible by extension of plurality of first contacts 230 and plurality of second contacts 240 through piezoelectric substrate layer 160.

Figure 3:
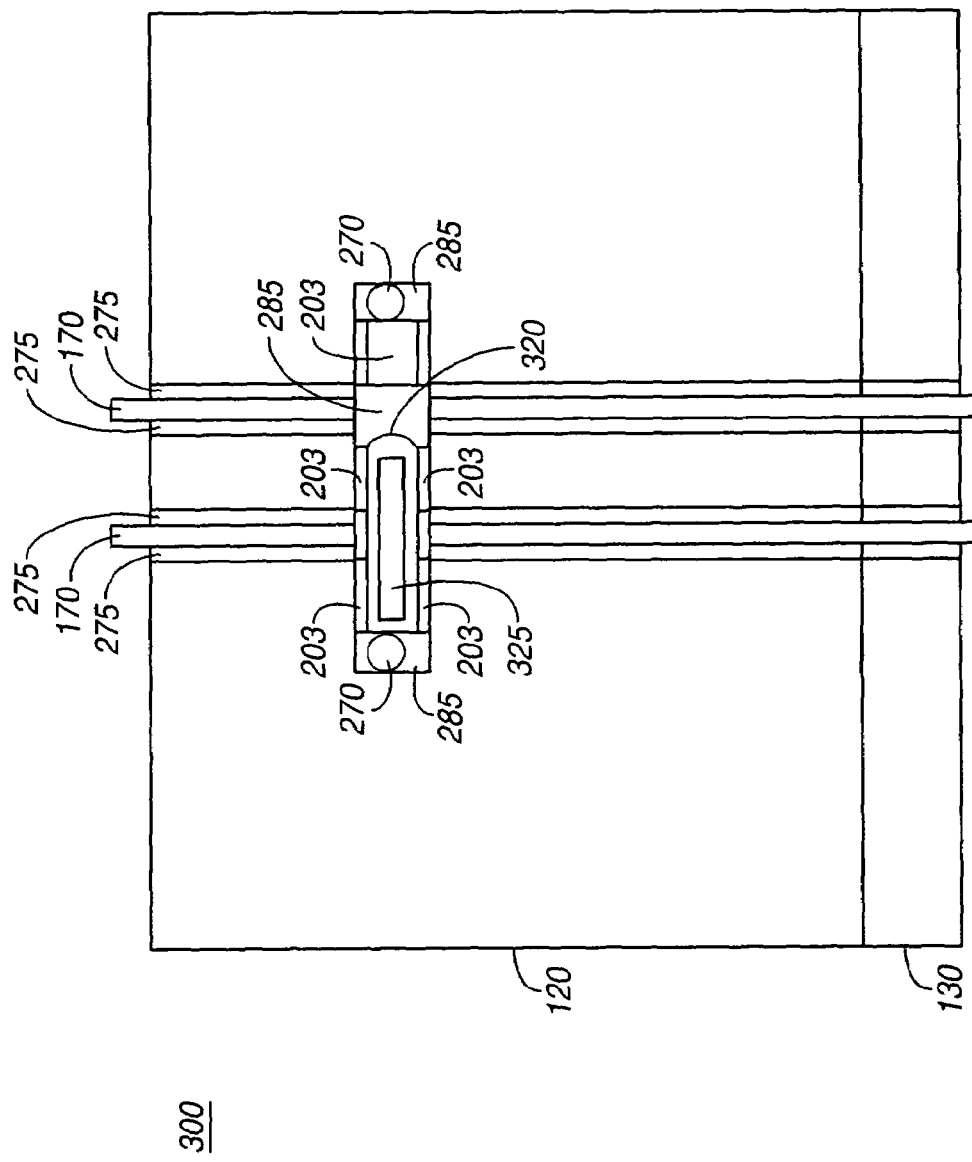
FIG. 3 is a top view of a pusher mode liquid metal optical switch with a cap layer removed, according to certain embodiments of the present invention.

Referring now to FIG. 3, a top view 300 of pusher mode liquid metal optical switch 105 with cap layer 110 removed is shown, according to certain embodiments of the present invention. The top view 300 illustrates that channel layer 120 is coupled to plurality of optical waveguides 170, wherein each optical waveguide of plurality of optical waveguides 170 is coupled to encapsulant 275. Channel 285 is coupled to channel layer 120 and comprises plurality of seal belts 203, liquid metal 320, and plurality of vias 270. In certain embodiments of the present invention, liquid metal 320 is coupled to two of the plurality of seal belts 203 at a given point in time. The liquid metal 320, such as mercury or a Gallium alloy, acts as a friction-reducing lubricant. In certain embodiments of the present invention, plurality of vias 270 are collinear with corresponding plurality of optical waveguides 170. Plurality of seal belts 203 are positioned between the plurality of optical waveguides 170 as shown in FIG. 3. It is noted that although two optical waveguides and three seal belts are shown in FIG. 3, a greater number of optical waveguides and seal belts could be used without departing from the spirit and scope of the present invention. As illustrated in the figure, via layer 130 has a greater width than channel layer 120.

Figure 4:
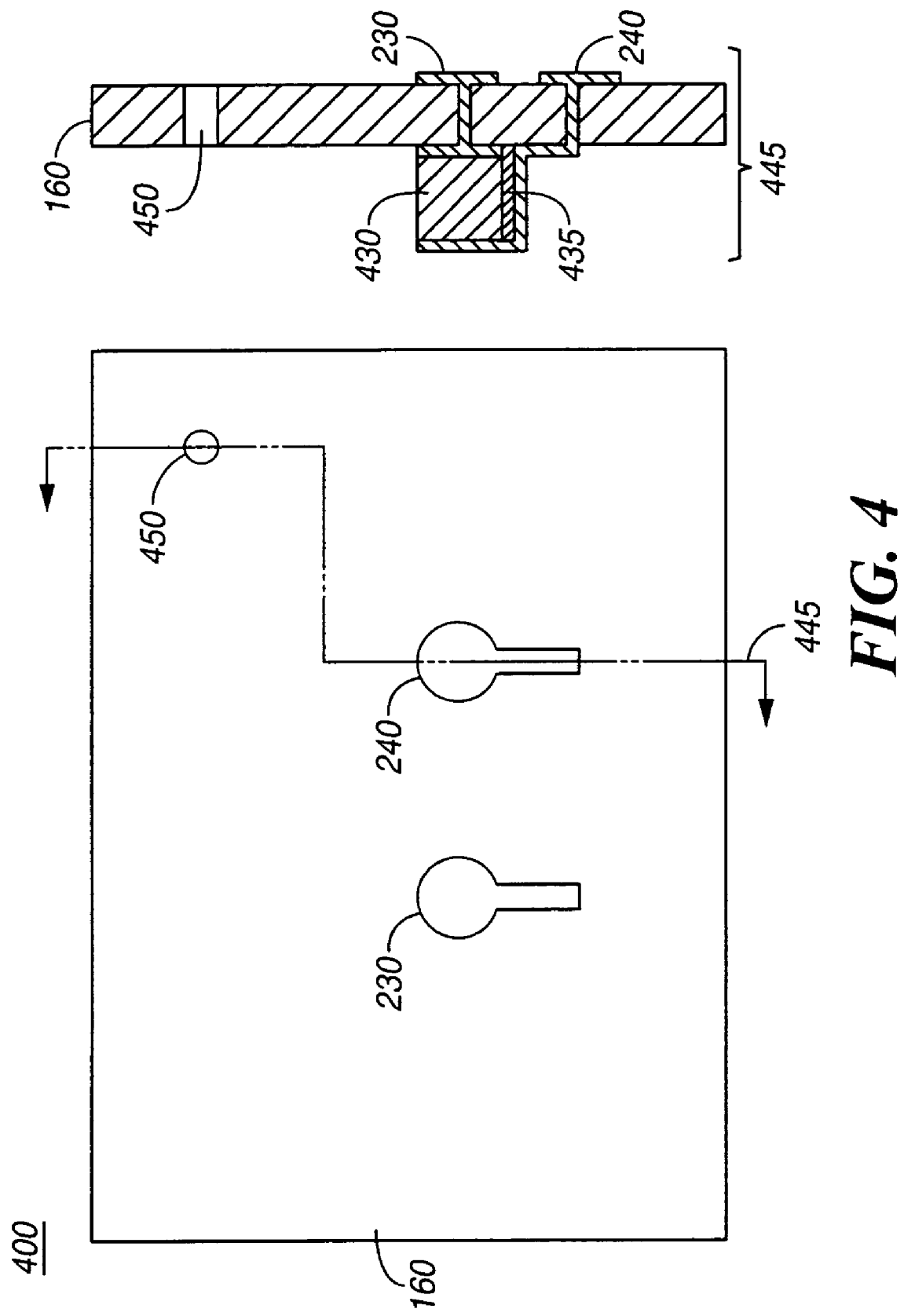
FIG. 4 is a top view of a piezoelectric substrate layer of a pusher mode liquid metal optical switch, according to certain embodiments of the present invention.

Referring now to FIG. 4, a top view 400 of piezoelectric substrate layer 160 of the pusher mode liquid metal optical switch 105 is shown, according to certain embodiments of the present invention. The top view 400 illustrates an orientation of plurality of first contacts 230 and plurality of second contacts 240. Sectional view 445 further shows the orientation of plurality of first contacts 240. Also shown in FIG. 4 is fill port 450. Fill port 450 is operable to be used to fill a reservoir of reservoir layer with actuating fluid 250. In certain embodiments of the present invention, actuating fluid 250 is filled during an assembly of pusher mode liquid metal optical switch 105, after which fill port 450 is sealed. In certain embodiments of the present invention, actuating fluid 250 is composed of an inert, low viscosity, high boiling point fluid such as 3M Fluorinert. It is understood that discussion of filling the reservoir includes the concept of not totally filling the reservoir with actuating fluid 250; the amount of fluid should be enough to permit actuation of switching.

Figure 5:
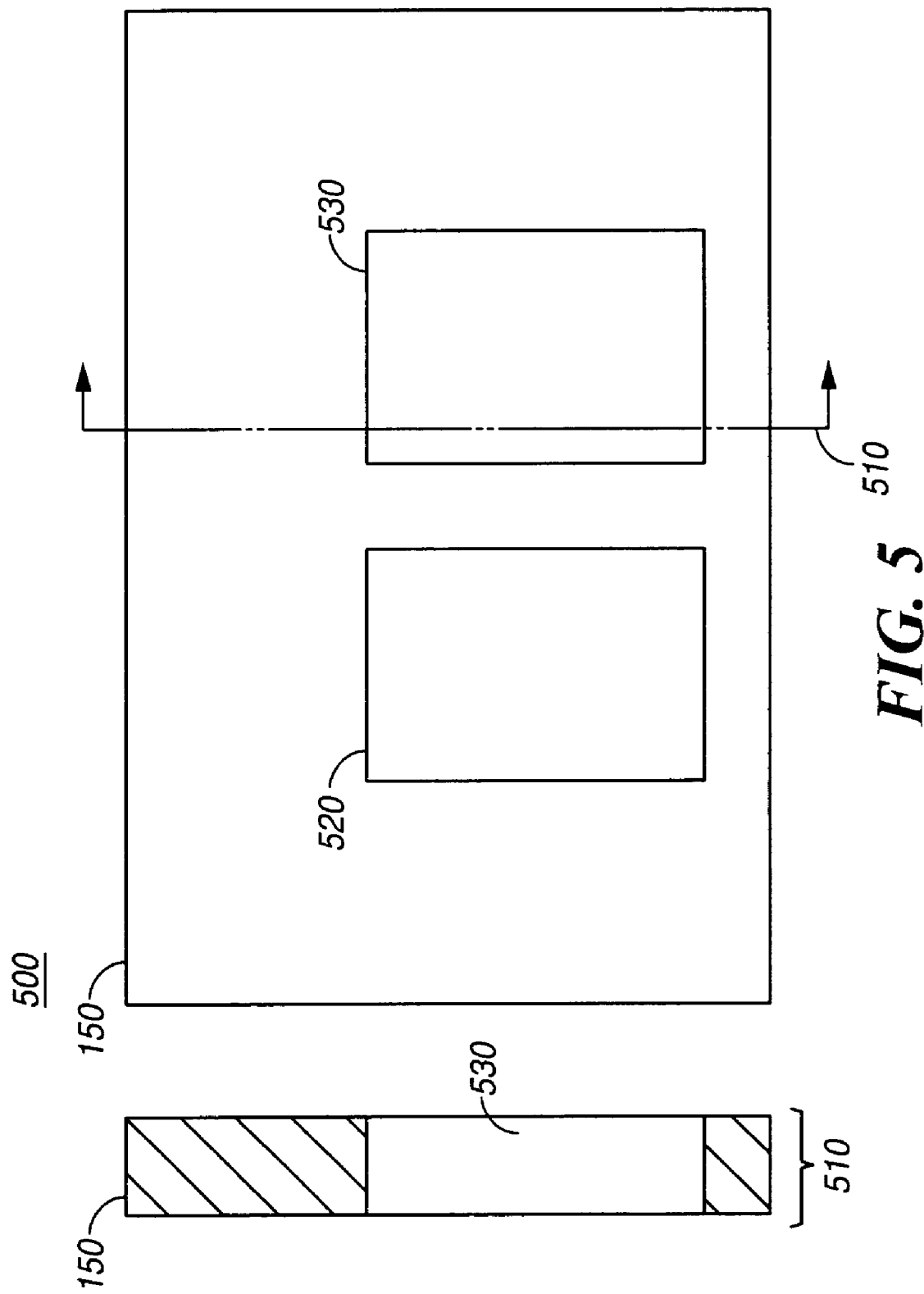
FIG. 5 is a top view of an actuator fluid reservoir layer of a pusher mode liquid metal optical switch, according to certain embodiments of the present invention.

Referring now to FIG. 5, a top view 500 of actuator fluid reservoir layer 150 of pusher mode liquid metal optical switch 105 is shown, according to certain embodiments of the present invention. The actuator fluid reservoir layer 150 comprises a plurality of fluid chambers 520, 530. In certain embodiments of the present invention, plurality of fluid chambers 520, 530 have a rectangular geometry in top view 500 although other geometries such as circular, square could be used without departing from the spirit and scope of the present invention. A cross-sectional view 510 is also shown in FIG. 5.

Figure 6:
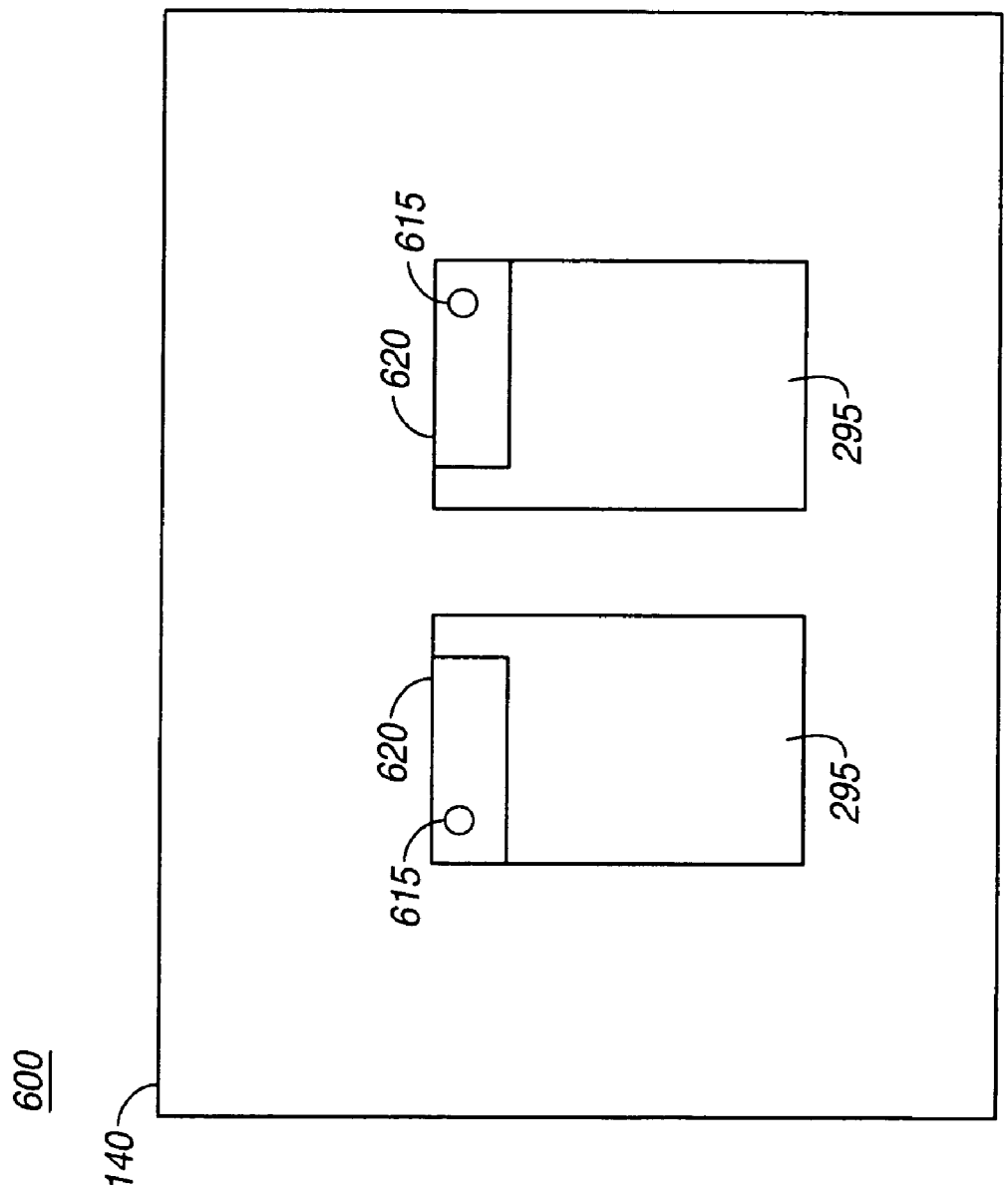
FIG. 6 is a top view of a chamber layer of a pusher mode liquid metal optical switch, according to certain embodiments of the present invention.

Referring now to FIG. 6, a top view 600 of chamber layer 140 of pusher mode liquid metal optical switch 105 is shown, according to certain embodiments of the present invention. FIG. 6 illustrates an orientation of plurality of membranes 295 coupled to chamber layer 140, and a location of a corresponding plurality of fluid ports 615. The plurality of rectangular regions 620 of chamber layer 140 have a thickness that is less than a thickness of chamber layer 140. The plurality of fluid ports 615 are operable to provide a source of actuator fluid 250 for chamber 290 from reservoirs 520, 530. It is noted that a width of plurality of fluid ports 615 is chosen so that a rapid deflection of a membrane of plurality of membranes 295 causes more of actuator fluid 250 to enter a via of plurality of vias 270 than enters the port of plurality of fluid ports 615. It is noted that an orientation of plurality of rectangular regions 620 relative to plurality of membranes 295 may be different from that shown in FIG. 6 without departing from the spirit and scope of the present invention. As an example, a first rectangular region of plurality of rectangular regions 620 and a first via of plurality of vias 270 could be located on a long axis of a first membrane of plurality of membranes 295.

Figure 7:
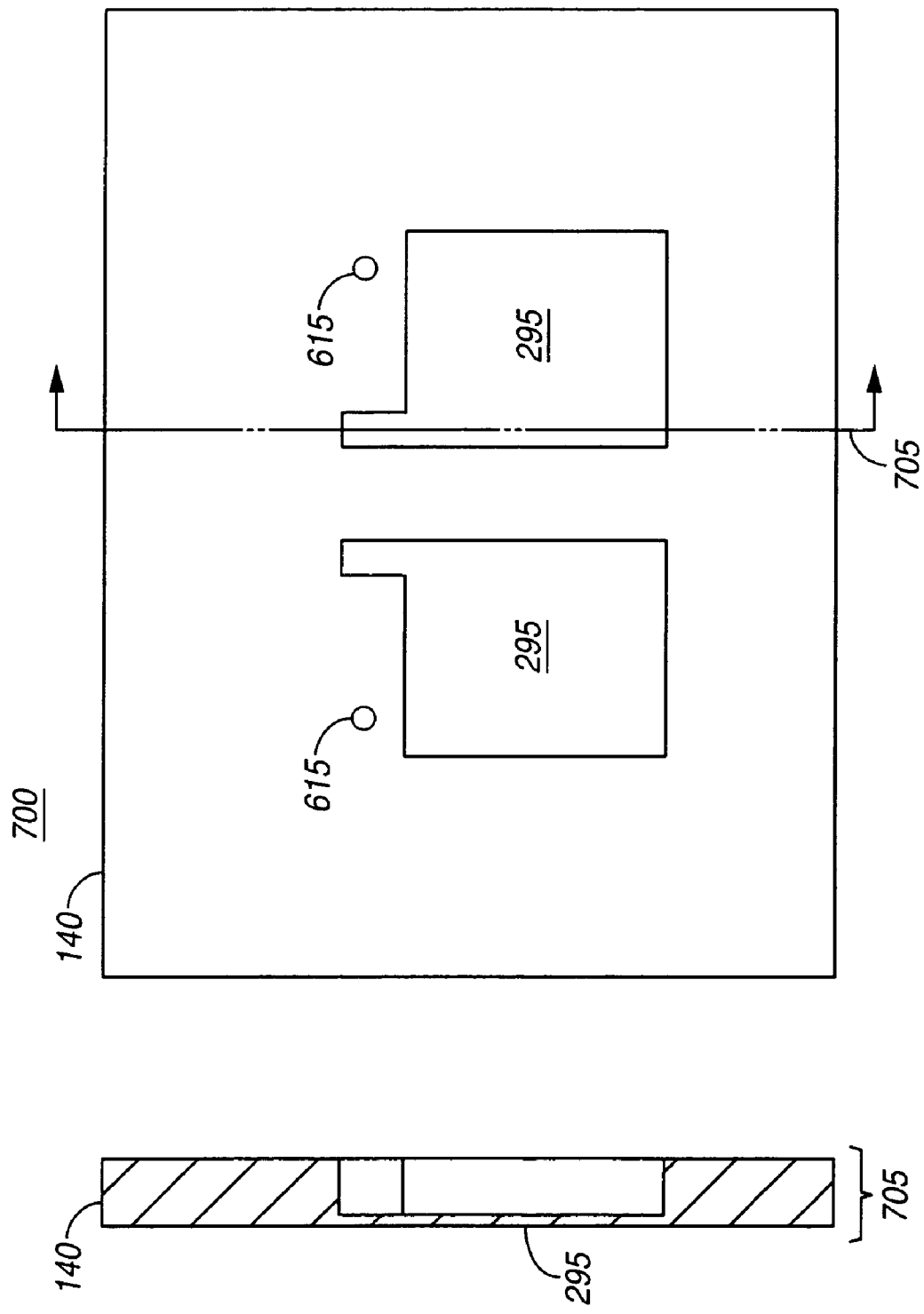
FIG. 7 is a bottom view of the chamber layer of a pusher mode liquid metal optical switch, according to certain embodiments of the present invention.

Referring now to FIG. 7, a bottom view 700 of the chamber layer 140 of pusher mode liquid metal optical switch 105 is shown, according to certain embodiments of the present invention. The bottom view 700 illustrates a shape of plurality of membranes 295 relative to chamber layer 140 and plurality of vias 615. A sectional view 705 of chamber layer 140 and a second membrane of plurality of membranes 295 is also shown. Sectional view 705 illustrates that in certain embodiments of the present invention, the second membrane is approximately centered within chamber layer 140.

Figure 8:
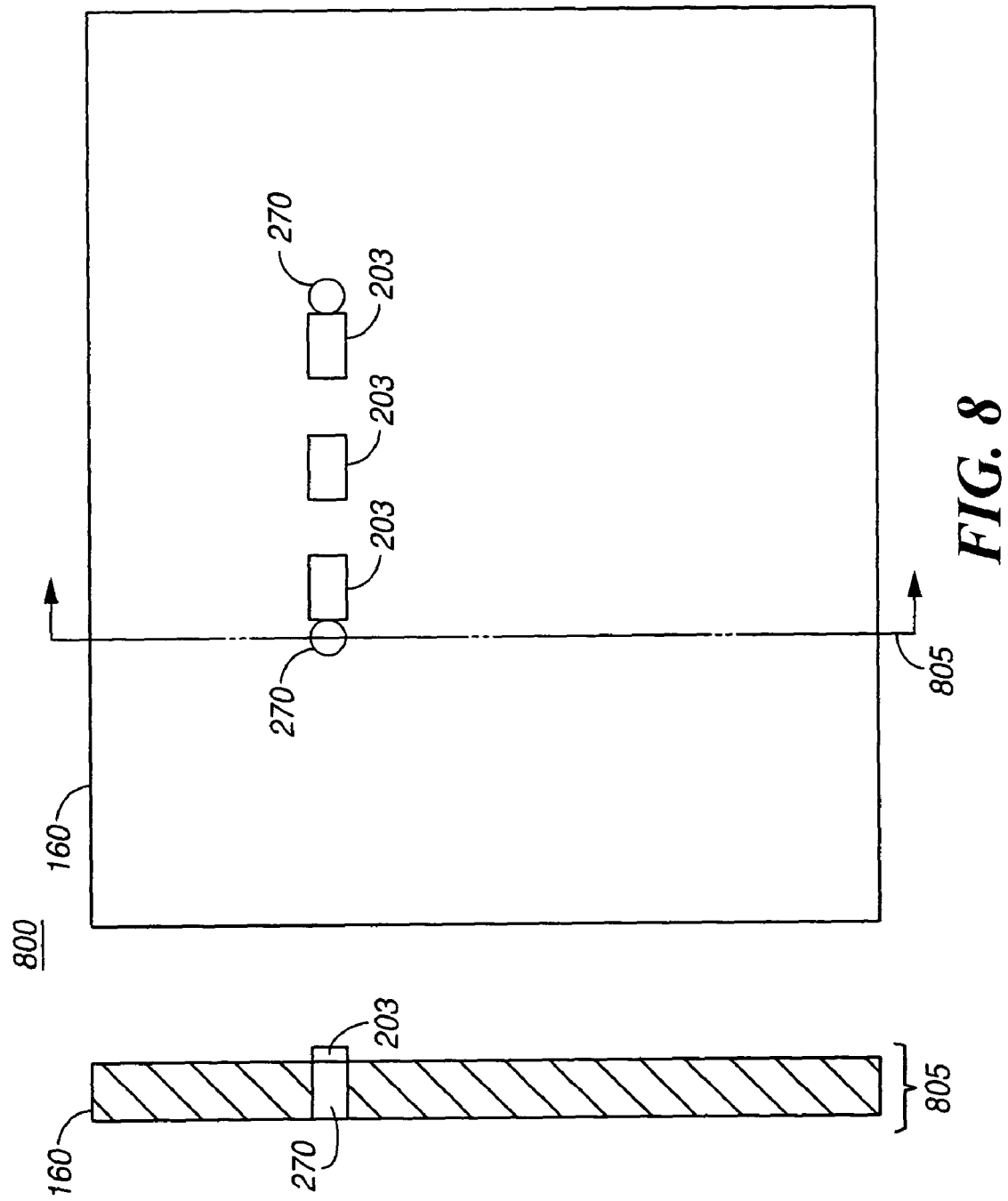
FIG. 8 is a top view of a via layer of a pusher mode liquid metal optical switch, according to certain embodiments of the present invention.

Referring now to FIG. 8, a top view 800 of via layer 160 of pusher mode liquid metal optical switch 105 is shown, according to certain embodiments of the present invention. The top view 800 illustrates a relative orientation of plurality of seal belts 203 and plurality of vias 270. In certain embodiments of the present invention, a third via of plurality of vias 270 is between any two seal belts of plurality of seal belts 203. A sectional view 805 of piezoelectric substrate layer 160 is also shown. Sectional view 805 illustrates a possible placement of plurality of seal belts 203 with respect to plurality of vias 270.

Figure 9:
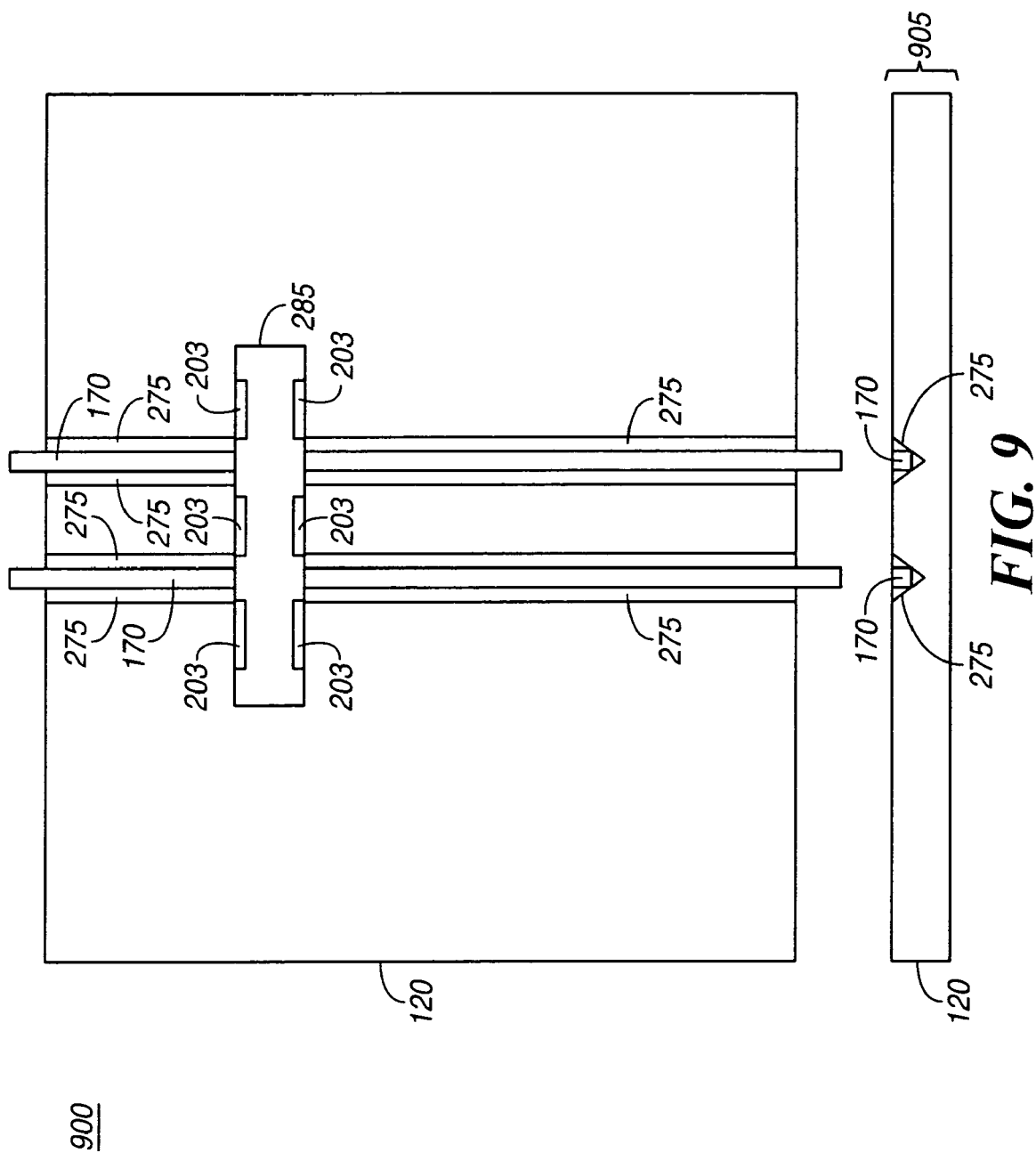
FIG. 9 is a top view of a channel layer of a pusher mode liquid metal optical switch, according to certain embodiments of the present invention.

Referring now to FIG. 9 a top view 900 of channel layer 120 of pusher mode liquid metal optical switch 105 is shown, according to certain embodiments of the present invention. The top view 900 illustrates an orientation of plurality of optical waveguides 170 and encapsulant 275 relative to plurality of seal belts 203 and chamber 285. In certain embodiments of the present invention, plurality of seal belts 203 are coupled directly to encapsulant 275. Side view 905 illustrates that encapsulant 275 and plurality of optical waveguides 170 are coupled to channel layer 120 using a V-shaped channel in channel layer 120. The V-shaped channel has a sufficient depth to accommodate plurality of optical waveguides 170 and encapsulant 275.

Figure 10:
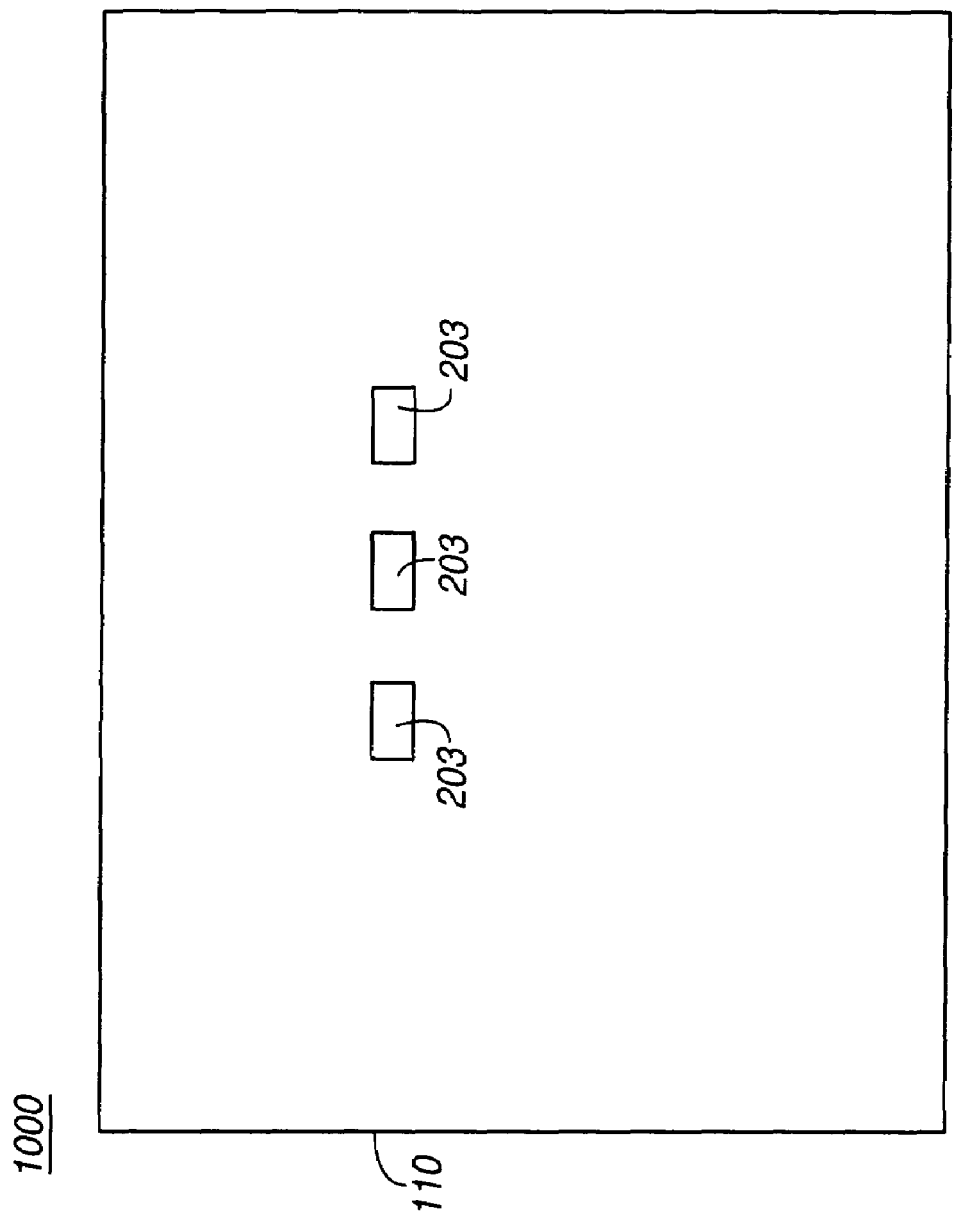
FIG. 10 is a bottom view of a cap layer of a pusher mode liquid metal optical switch, according to certain embodiments of the present invention.

Referring now to FIG. 10 a bottom view 1000 of cap layer 110 of pusher mode liquid metal optical switch 105 is shown, according to certain embodiments of the present invention. The bottom view 1000 is shown with a plurality of seal belts 203.

Certain embodiments of the present invention use a pressurization of actuator liquid 250 by actuation of the plurality of piezoelectric elements 245 against plurality of membranes 295 to drive liquid metal 320 from a first wetting seal belt of plurality of seal belts 203 to a second wetting seal belt of plurality of seal belts 203, thereby causing one or more optical waveguides of the plurality of optical waveguides 170 to be obscured or unblocked and changing a state of the liquid metal optical switch 105. The liquid metal optical switch 105 latches by a wetting of the one or more seal belts of the plurality of seal belts 203 and a surface tension of the liquid metal 320 causing the liquid metal 320 to stay in a stable position. In certain embodiments of the present invention, the plurality of optical waveguides 170 have faces that are not wettable by the liquid metal 320 in order to preserve an optical clarity of a signal path of the plurality of optical waveguides 170. The method described here uses the plurality of piezoelectric elements 245 in a pushing mode. In certain embodiments of the present invention, a power consumption of liquid metal optical switch 105 is much lower than a device that uses heated gas to push the liquid metal 320 to a new position since the plurality of piezoelectric elements 245 stores energy rather than dissipating energy. One or more of the plurality of piezoelectric elements 245 may be used to pull as well as push, so there is a double-acting effect not available with an actuator that is driven solely by a pushing effect of expanding gas. In certain embodiments of the present invention, the use of pushing piezoelectric elements and pulling piezoelectric elements is operable to decrease a switching time of liquid metal optical switch 105. As an example, a first piezoelectric element of plurality of piezoelectric elements 245 may be used to push actuator fluid 250 while a second piezoelectric element of plurality of piezoelectric elements 245 may be used to pull actuator fluid 250. The pushing and pulling may be timed so that a switching time of liquid metal optical switch 105 is decreased.

Liquid metal 320 is contained within the channel 285 of the liquid metal channel layer 120 and contacts two of the plurality of seal belt pads 203. An amount and location of the liquid metal 320 in the channel 285 is such that only two seal belt pads of plurality of seal belt pads 203 are connected at a time. The liquid metal 320 can be moved to contact a different set of two seal belt pads of the plurality of seal belt pads 203 by creating an increase in pressure between a first seal belt pad and a second seal belt pad such that the liquid metal 320 breaks and part of the liquid metal moves to couple to the second seal belt pad and a third seal belt pad. This is a stable configuration (i.e. latching) because the liquid metal 320 wets the plurality of seal belt pads 203 and is held in place by a surface tension.

In certain embodiments of the present invention, actuator fluid 250 is an inert and electrically nonconductive liquid that fills a remaining space in the liquid metal optical switch 105. The plurality of membranes 295 is made of metal, although other materials are possible such as polymers without departing from the spirit and scope of the present invention. The plurality of fluid ports 615 that connects the chamber 290 with the plurality of actuator fluid reservoirs are smaller than plurality of vias 270 and assists in causing a pressure pulse to move the liquid metal 320 by directing most of an actuator fluid flow from an actuator action into the channel 285 rather than into a fluid reservoir at a high fluid flow rate, but allows the chamber 290 to refill without disturbing the a position of liquid metal 320 at low fluid speeds.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A structure for an optical switch, comprising:
    a chamber housed within a solid material, said chamber having an actuator liquid;
    a plurality of seal belts within the chamber, wherein the plurality of seal belts are coupled to the solid material;
    a plurality of liquid metal globules, coupled to the plurality of seal belts and coupled to the chamber;
    a plurality of piezoelectric elements coupled to a plurality of membranes, said plurality of membranes coupled to the chamber; and
    a plurality of optical waveguides coupled to the chamber, said plurality of optical waveguides operable to be blocked or unblocked by the plurality of liquid metal globules.

2. The structure of claim 1, wherein the actuator liquid is inert and electrically non-conductive and has a low viscosity.

3. The structure of claim 1, wherein the plurality of optical waveguides have faces that are not wettable.

4. The structure of claim 1, wherein the actuating liquid is Fluorinert.

5. The structure of claim 1, wherein the plurality of piezoelectric elements are within one or more reservoirs, said one or more reservoirs containing actuating liquid operable to replenish the actuator fluid in the chamber.

6. The structure of claim 1, wherein the one or more liquid metal globules are composed of mercury.

7. The structure of claim 1, wherein the plurality of membranes are coupled to a corresponding plurality of vias, wherein a via of the plurality of vias is operable to increase a rate of flow of the actuating liquid.

8. The structure of claim 1, wherein the plurality of membranes have a corresponding plurality of widths, said corresponding plurality of widths being greater than an extent in a non-actuating direction of the plurality of piezoelectric elements.

9. The structure of claim 1, wherein the plurality of piezoelectric elements are further coupled to a corresponding plurality of contacts, said plurality of contacts operable to actuate the plurality of piezoelectric elements.

10. The structure of claim 8, wherein each contact of the plurality of contacts comprise a first terminal coupled to a first end of a piezoelectric element and a second terminal coupled to a second end of the piezoelectric element.

11. The structure of claim 9, wherein the first terminal and the second terminal are separated by a dielectric.

12. A structure for an optical switch, comprising:
  a piezoelectric substrate layer;
  an actuator fluid reservoir layer coupled to the piezoelectric substrate layer, said actuator fluid reservoir layer further comprising a plurality of piezoelectrically actuated pusher elements;
  a chamber layer coupled to the actuator fluid reservoir layer, said chamber layer comprising a plurality of membranes coupled to the plurality of piezoelectrically actuated pusher elements;
  a via layer coupled to the chamber layer, wherein said via layer comprises a plurality of vias;
  a liquid metal channel layer coupled to the via layer, said liquid metal channel layer coupled to a plurality of optical waveguides; and
  an actuator liquid-filled chamber housed within the liquid metal channel layer, wherein the actuator liquid-filled chamber comprises one or more globules of liquid metal coupled to a plurality of seal belts, said actuator liquid-filled chamber coupled to the plurality of membranes by the plurality of vias and said one or more globules of liquid metal operable to block or unblock the plurality of optical waveguides.

13. The structure of claim 11, wherein the via layer, actuator fluid reservoir layer, piezoelectric substrate layer, chamber layer, via layer and liquid metal channel layer may be composed of one or more of glass, ceramic, composite material and ceramic-coated material.

14. The structure of claim 11, wherein the plurality of optical waveguides have faces that are not wettable.

15. The structure of claim 11, wherein the actuator fluid reservoir layer further comprises a fill port, said fill port operable to be used for filling a reservoir of the actuator fluid reservoir layer with actuator fluid.

16. The structure of claim 11, wherein the circuit substrate layer further comprises a plurality of circuit traces and a plurality of pads operable to route one or more signals generated by actuation of one or more of the plurality of piezoelectric elements.

17. The structure of claim 11, wherein the actuator liquid is inert and electrically non-conductive.

18. The structure of claim 11, wherein the one or more liquid metal globules are composed of mercury.

19. The structure of claim 11, wherein the plurality of vias are operable to increase a rate of flow of the actuating liquid.

20. The structure of claim 11, wherein the membrane layer further comprises one or more fluid ports, said one or more fluid ports operable to replenish an amount of actuator fluid in a fluid chamber of the chamber layer from a one or more reservoirs of the actuator fluid reservoir layer.

21. The structure of claim 20, wherein the one or more fluid ports have a size that enables the replenish of the actuator fluid without substantially reducing a rate of flow of actuator fluid into the actuator liquid-filled chamber.

22. The structure of claim 11, wherein the plurality of piezoelectric elements are further coupled to a corresponding plurality of contacts, said plurality of contacts operable to actuate the plurality of piezoelectric elements.

23. The structure of claim 22, wherein each contact of the plurality of contacts comprise a first terminal coupled to a first end of a piezoelectric element and a second terminal coupled to a second end of the piezoelectric element.

24. The structure of claim 23, wherein the first terminal and the second terminal are separated by a dielectric.

25. A method for switching of one or more optical signals using a liquid metal switch, comprising:
  actuating one or more piezoelectric elements;
  deflecting one or more corresponding membrane elements by the actuation of the one or more piezoelectric elements;
  changing a pressure of actuator liquid by the deflection of the one or more membrane elements; and
  the change in pressure of the actuator liquid breaking a liquid metal connection between a first contact and a second contact of the liquid metal switch thereby blocking or unblocking one or more of a plurality of optical waveguides.

26. The method of claim 25, wherein the piezoelectric element is actuated by an application of an electric potential applied to a first side and a second opposite side of the piezoelectric element.

27. The method of claim 25, wherein the liquid metal connection is maintained by a surface tension between a liquid metal and the first contact and the second contact.

28. The method of claim 25, wherein prior to an operation of the electrical switch, actuator fluid is added to the liquid metal switch using a fill port.

29. The method of claim 25, wherein one or more vias coupled to the one or more membranes are used to increase a flow rate of actuator liquid caused by the increase in pressure, said increased flow rate operable to more rapidly break the liquid metal connection.

30. The method of claim 25, wherein after breaking the liquid metal connection, a second liquid metal connection is established between the second contact and a third contact.

31. The method of claim 30, further comprising breaking the second liquid metal connection by application of a second electric potential with a polarity opposite the first electric potential, said second electric potential actuating the piezoelectric element so that a negative pressure is exerted on the membrane element thereby pulling the liquid metal to re-establish the liquid metal connection between the first contact and the second contact and break the second liquid metal connection between the third contact and the second contact.

32. The method of claim 30, further comprising breaking the second liquid metal connection by the use of a second piezoelectric element, a second membrane element, a second electric potential, whereby the second electric potential actuates the second piezoelectric element causing the second membrane element to deflect and increase the pressure of the actuator fluid, said actuator fluid then being operable to flow and break the second liquid metal connection.

* * * * *